Aug. 29, 1933.  A. P. BARNES  1,924,392

FRUIT CUTTING MACHINE

Filed July 8, 1931   2 Sheets-Sheet 1

INVENTOR
ALVIN P. BARNES
BY
Reif & Braddock
ATTORNEY

Aug. 29, 1933.  A. P. BARNES  1,924,392
FRUIT CUTTING MACHINE
Filed July 8, 1931  2 Sheets-Sheet 2

INVENTOR
ALVIN P. BARNES
BY
ATTORNEY

Patented Aug. 29, 1933

1,924,392

UNITED STATES PATENT OFFICE 1,924,392

FRUIT CUTTING MACHINE

Alvin P. Barnes, Minneapolis, Minn., assignor, by mesne assignments, of one-third to H. W. Gehr, Anoka, Minn., and one-third to Isabell Hodge Barnes, Minneapolis, Minn., and one-third to Earl C. Friel, Minneapolis, Minn.

Application July 8, 1931. Serial No. 549,364

11 Claims. (Cl. 146—72)

This invention relates to a method and apparatus for cutting fruit. It is desirable in serving various kinds of fruit and vegetables, to have the same cut into attractive and ornamental form. One such form in fruit such as cantaloupes, honeydew melons, tomatoes, etc., is to have a semi-spherical portion of said fruit cut along a great or small circle thereof with V-shaped cuts extending radially thereof. One convenient way of making such cuts is to rotate the fruit through a partial revolution substantially equal to the width of the cut between each of said cuts, so that the fruit is simultaneously severed and cut into the desirable or decorative form. It further enhances the appearance and attractiveness of the fruit to have the said V-shaped cuts tapering toward the center of the fruit, so that each cut piece has a surface comprising a plurality of radially extending tapering V-shaped ribs thereon.

It is an object of this invention, therefore, to provide a machine which will quickly and efficiently cut or sever a fruit to cut the same into a decorative and attractive form.

It is a further object of the invention to provide a fruit cutting machine having a fruit holding means and a knife V-shaped in cross section reciprocating substantially radially of said fruit at an intermediate portion thereof.

It is a further object of the invention to provide a fruit cutting machine having a fruit holding means for holding said fruit and intermittently rotating the same about an axis thereof, together with a reciprocating knife of angular shape reciprocated in a line extending transversely of said axis and substantially radially of said fruit, said fruit being rotated between each reciprocation of said knife.

It is a further object of the invention to provide a method of cutting fruit which consists in making a series of inclined cuts in said fruit from the exterior radially toward the center thereof, said cuts being contiguous so that said fruit is severed in two pieces, each having a cut surface composed of angular ribs or surfaces.

It is a still further object of the invention to provide a method of cutting and severing a fruit which consists in holding a fruit for rotation about an axis thereof and making a series of angle-shaped cuts in said fruit directed along a line transverse to said axis and radially of said fruit, the fruit being rotated between each cut so that the fruit is severed into two pieces, each having a cut surface comprising a plurality of radially extending angular or V-shaped ribs which may be tapered.

It is also an object of the invention to provide a machine for cutting fruit comprising means for yieldingly holding the fruit, which means is adjustable and rotatable, a knife of V-shape or angular shape in cross section preferably tapered to a point, together with means for reciprocating said knife transversely of said fruit to cut the same, and means actuated by the last mentioned means for rotating said fruit in synchronism with the reciprocations of said knife.

These and other objects and advantages of the invention will be fully set forth in the following description made in connection with the accompanying drawings, in which like reference characters refer to similar parts throughout the several views and in which:—

Figure 2:
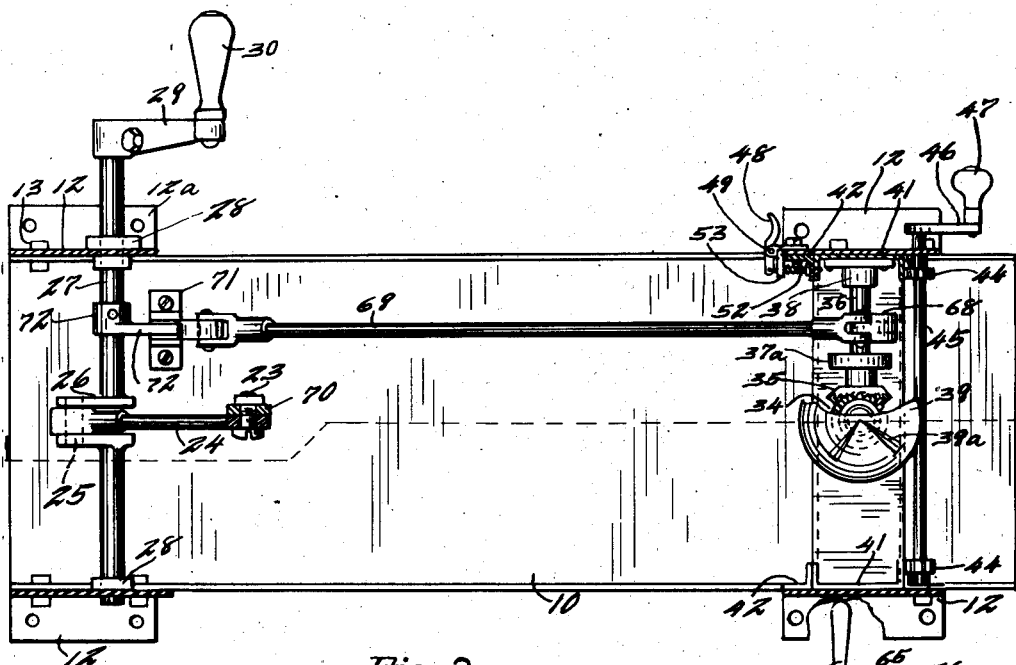
Fig. 2 is a horizontal section taken on line 2—2 of Fig. 1.
Figure 1:
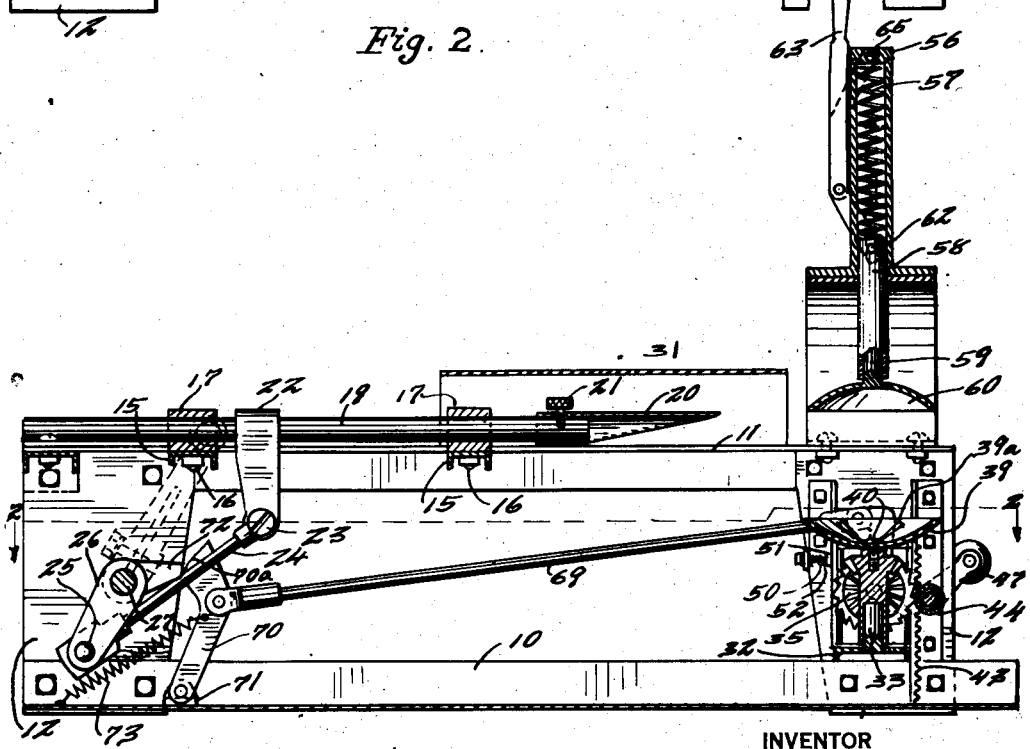
Fig. 1 is a vertical section taken on line 1—1 of Fig. 2.
Figure 3:
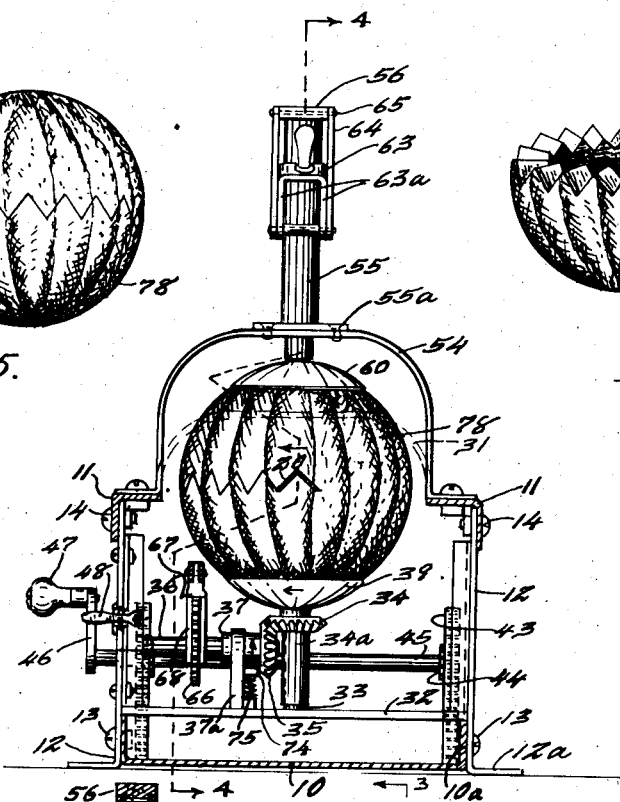
Fig. 3 is a vertical section taken on line 3—3 of Fig. 4.

Referring to the drawings, a machine is shown comprising a frame, and while this frame may be variously formed, in the embodiment of the invention illustrated it is shown as comprising a channel shaped blade 10 having its flanges directed vertically, a pair of oppositely disposed angle members 11 with their flanges disposed vertically and horizontally, said horizontal flanges being directed toward each other and said angle members 11 being spaced some distance above member 10 and in substantially the same plane. Adjacent the ends of members 10 and 11 are disposed vertical members 12 having out-turned lower flanges 12a resting on the supporting surface. Members 12 are secured to the outer sides of the flanges 10a of member 10 by the screws 13 and are secured to the inner sides of the vertical flanges of member 11 by the screws 14. One of the members 12 has its rear edge flush with the other rear ends of members 11 and 12, while the other member 12 is disposed with its front edge spaced some distance from the front edge of member 10, but substantially flush with the front ends of members 11. Members 11 are connected by a plurality of spaced channel members 15 having their flanges directed downwardly and secured to the horizontal flanges of members 11 by the bolts 16, said members 15 being shown as three in number. Bearings 17 are supported centrally on two of the members 15, said bearings having side flanges secured to members 15 by the headed and nutted bolts 18. A plunger rod 19 is fitted in and longitudinally slidable in the bearings 17 and said plunger carries at its front end a knife 20 of angular or inverted V-shape in cross section as shown in Fig. 3, said knife preferably tapering to a point at its front end. This knife is shown as having its side edges toothed or serrated. While knife 20 can be secured to plunger 19 in various ways, in the embodiment of the invention illustrated it is shown as having a cylindrical sleeve at its rear end fitting over the end of plunger 19 and secured thereto by a thumb screw 21. An arm 22 is secured to plunger 19 between the bearings 17 and extends downwardly into said plunger, the same being apertured at its lower end to receive the pivot bolt 23 pivotally connecting a link 24 to said arm 22. Link 24 is connected at its other end to crank pin 25 extending between the outer ends of crank arms 26 carried on a crank shaft 27 which extends between and is journaled in bearings 28 secured in any suitable manner in the members 12. The shaft 27 extends beyond one of the bearings 28 and has secured thereto a crank arm 29 having a crank handle 30 rotatably connected thereto. A guard member 31 extends upwardly in arcuate form between members 11 over the knife 20 as shown in Figs. 1 and 3. A plate or bar 32 extends between the front members 12 on top of flanges 10a. A stud 33 projects upwardly centrally of bar 32 and a beveled gear 34 has a sleeve 34a extending downwardly therefrom, bored to receive the stud 33 and rotate thereon, said sleeve having its lower end spaced some distance from the top of bar 32. The beveled gear 34 meshes with another beveled gear 35 carried on a shaft 36 rotatable in a bearing 37 having a standard 37a supported from bar 32. Shaft 36 extends to and is journaled in another bearing 38 secured to a member to be later described. Gear 34 has an upwardly projecting cylindrical portion to which is secured a semi-spherical cup 39 by means of a screw 40 extending centrally thereof into gear 34. Cup member 39 preferably has formed thereon a plurality of upwardly projecting and radially extending ribs 39a preferably having sharpened upper edges.

Bar 32 is secured at its ends to vertically extending channel members 41. Said channel members 41 have their flanges directed inwardly and are guided in a guideway formed by angle members 42 secured to the inner side of the front members 12. The bearing 38 is secured to one of members 41. Members 41 carry at their sides opposite angles 42, racks 43. Racks 43 have meshing therewith respectively, pinions 44 secured to a shaft 45 extending between and journaled in the vertical portions of the front members 12. Shaft 45 extends to the outer side of one member 12 and has secured thereto a crank arm 46 having the crank handle 47 rotatably connected thereto. A lever 48 is pivoted intermediate its ends to a lug 49 extending from member 12 and said lever is pivotally connected at its inner end to one end of a pin 50 extending through one flange of the angle member 42 and engaging one flange of one of the channel members 41. Pin 50 has a collar 51 thereon against which presses a coiled spring 52 encircling said pin and bearing at its other end against a plate 53. The outer end of lever 48 is formed as a thumb piece.

An upwardly curved yoke or arcuate member 54 is secured to the upper side of members 11 and extends transversely between said members above the cup 39. Member 54 has secured to its upper end a tubular guide 55 having a flange 55a riveted or otherwise fastened to member 54. Member 55 has a cap 56 closing its upper end and contains a compression coil spring 57 bearing at its upper end against said cap and at its lower end against a sleeve 58 of tubular form, projecting downwardly through member 54. Member 58 has rotatably mounted therein a stem 59 having secured to its lower end a semi-spherical cup 60 having its concave side directed downwardly and revoluble about a vertical axis coincident with the axis of gear 34. The sleeve 58 has its upper end closed and a ball 61 is disposed between said upper end and the upper end of stem 59. Member 55 has elongated vertically extending slots in its opposite sides and member 58 has pins 62 projecting through said slots pivotally received in the lower ends of arms 63a of the lever handle 63, said lever being supported by a pair of links 64 pivoted thereto at their lower ends and pivoted at their upper ends to pins 65 projecting from the opposite sides of cap 56.

Shaft 36 described has secured thereto a ratchet wheel 66 adapted to be engaged by a pawl 67 carried on an arm 68 journaled on shaft 36, said arm having parallel portions disposed respectively at each side of the ratchet wheel 66. Arm 68 is connected by the link rod 69 having forks at its ends respectively engaging arms 68 and the cam arm 70, which cam arm is pivoted to a small bearing 71 secured to the bottom of the channel member 10. Lever 70 has a cam surface 70a engaged by the rotating cam or dog 72 secured to shaft 27. Lever 70 is normally moved into position to be engaged by member 72 by a tensile coiled spring 73 secured to said lever at one end and to the bottom of member 10 at its other end. A brake member 74 is held against the hub of gear 35 by a compression coiled spring 75 resting on bar 32.

Figure 5:
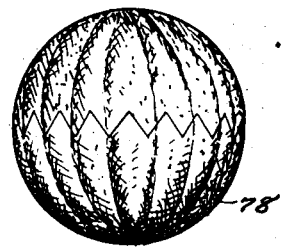
Fig. 5 is a view in side elevation of the fruit after being severed by the machine but not separated.
Figure 6:
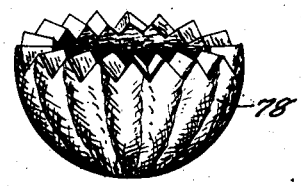
Fig. 6 is a perspective view of one piece or half of the severed fruit.
Figure 4:
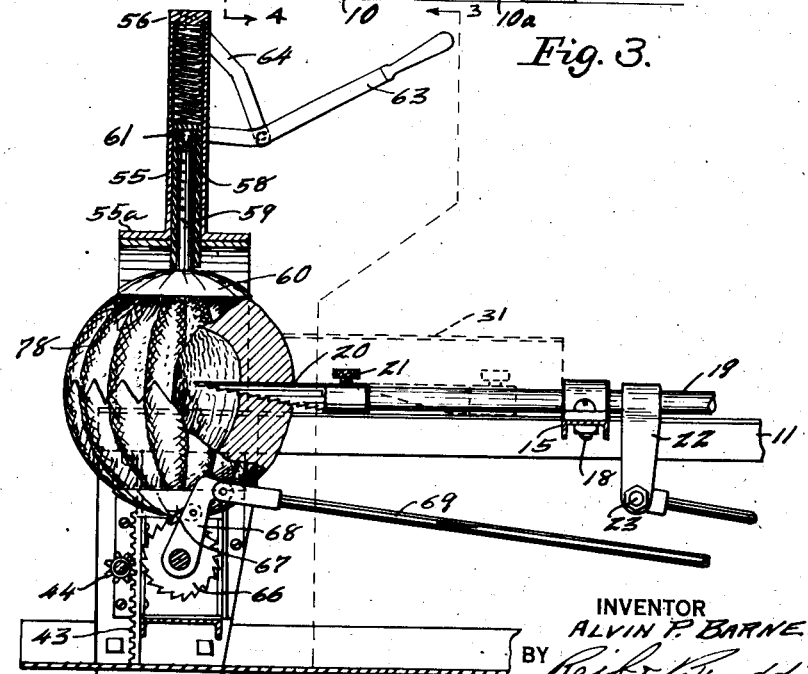
Fig. 4 is a vertical section taken on line 4—4 of Fig. 3.

In operation a fruit such as a cantaloupe 78 is placed preferably with its axis vertical in the member 39 and pressed thereinto so as to engage the ribs 39a. The support 39 will be adjusted so that the point of knife 20 is in a plane extending substantially through the widest portion of the fruit 78. Member 39 can be adjusted by turning the crank 46 and through pinions 44 raising the bar 32 and parts carried thereby. Before the crank 46 can be operated, lever 48 must be operated to withdraw pin 50 from engagement with the member 41. This pin therefore acts as a lock member to hold bar 32 and parts carried thereby in the proper position. When fruit 78 is placed in position, lever 63 is depressed and thus raises member 70 and the cup member 60. When the fruit is in position lever 63 is released and spring 57 forces cup member 60 downwardly against the fruit to hold it in the position shown in Figs. 3 and 4. The operator now rotates the crank 29 and this, through the crank arms 26 and link 24 reciprocates plunger 19 and knife 20. Knife 20 enters the fruit, the point extending substantially to or slightly past the center thereof as shown in Fig. 4. The operator continues to turn crank 29 and as shaft 27 revolves, at each revolution member 72 presses on the upper end of lever 70, swinging said lever toward the front of the machine in which the fruit is held against the tension of spring 73. Link 69 is moved by lever 70 and swings arm 68 a sufficient distance to cause pawl 67 to rotate ratchet wheel 66 the distance of one tooth. This rotates gear 35 and gear 34. Gear 34 is secured to cup 39 which is in firm engagement with the fruit 78 and the fruit is thus turned through a partial revolution. It will be noted that cup 60 can turn freely with its stem 59, the latter being in engagement with ball 61. The gears 35 and 34 are so proportioned that the fruit 78 is turned a distance substantially equal to the width of the cut made by knife 20. As crank 29 is turned, therefore, knife 20 is reciprocated and the fruit is turned between each reciprocation of the knife 20. When the fruit has been turned through 360°, it will appear as shown in Fig. 5 and will have been severed into two pieces, each piece being such as shown in Fig. 6. It will be seen that each piece has its cut edge provided with a series of radially extending ribs or ridges of inverted V-shape in cross section and tapering inwardly toward the center of the fruit. The fruit is thus simultaneously divided and cut into ornamental and attractive appearance. Heretofore, if any such decorative appearance was desired, it would have to be done slowly and tediously by the operator and would usually not be uniform. The machine operates very rapidly to quickly and accurately sever and cut the fruit. The member 31 acts as a guard so that the operator will not carelessly place his hand between the point of the knife 20 and the fruit where it might be injured. The brake 75 acts to prevent too much rotation or jumping of the gear 35 so that the fruit will be turned only the desired amount with each rotation of crank 29.

From the above description it is seen that applicant has provided a very simple and efficient machine for dividing a fruit and at the same time cuting it into ornamental and attractive appearance for serving. The machine is easily and quickly operated and has a high degree of utility for use in hotels, restaurants, hospitals, steamship and railway dining rooms, and other places where quite a lot of fruit is served. The device is used for such fruit as cantaloupe, grapefruit, oranges, honeydew melons, and can be used for cutting tomatoes when it is desired to decorate them for use in salads. It can also be used to cut potatoes for various purposes. The machine has been constructed to be sanitary and easily cleaned. The same has been amply demonstrated in actual practice and found to be very successful and efficient.

It will, of course, be understood that various changes may be made in the form, details, arrangement and proportions of the apparatus and in the steps and sequence of steps of the method without departing from the scope of applicant's invention, which, generally stated, consists in a method and apparatus capable of carrying out the objects above set forth, such as disclosed and defined in the appended claims.

What is claimed is:—

1. A machine for simultaneously dividing and serrating a fruit having in combination, means engaging the bottom of said fruit, means for engaging the top of said fruit, means for intermittently rotating one of said means to rotate said fruit, an angular knife reciprocable in a plane substantially midway between said means, and means for reciprocating said knife in synchronism with the intermittent rotation of said means.

2. A machine for cutting a fruit having in combination, means for engaging the top and bottom of said fruit, means for adjusting said means vertically to suit various sizes of fruit, means for intermittently rotating a portion of said means to rotate said fruit, a knife reciprocable to cut said fruit, and means for reciprocating said knife in synchronism with said intermittent rotation of said fruit to cut the same.

3. A machine for serrating a fruit having in combination, means supporting said fruit, means engaging the top of said fruit, one of said means being yieldingly movable toward and from the other means to intermittently rotate one of said means to intermittently rotate said fruit, a knife having sides disposed at an angle to each other and tapering to a point, reciprocable transversely of said fruit, and means for reciprocating said knife to cut said fruit in synchronism with the rotation thereof.

4. A machine for serrating a fruit having in combination, a supporting holder for fruit having means for biting into and holding said fruit, another holder for said fruit coaxial with said first mentioned holder and freely rotatable, means for resiliently pressing said last mentioned holder toward said first mentioned holder, means for vertically adjusting said first mentioned holder, a knife having an inclined side reciprocable in a line extending transversely of the axis of said holders, means for reciprocating said knife, and means actuated from said last mentioned means for intermittently rotating said first mentioned holder.

5. A machine for cutting an edible having in combination, means for supporting said edible, a narrow reciprocable knife for severing said edible into a plurality of parts by making a plurality of related cuts in the edible, means for accomplishing relative rotation step by step of said edible and knife about a central axis of said edible, and means for reciprocating said knife at intervals between said step by step rotations.

6. A machine for cutting an edible having in combination, means for supporting said edible, a narrow reciprocable knife for severing said edible into a plurality of parts by successively making a plurality of related cuts in the edible from different circumferential points relative to the exterior surface thereof, means for intermittently relatively rotating said edible and knife about a central axis of said edible, and means for reciprocating said knife toward said axis to accomplish a cut upon said edible at each interval between successive intermittent relative rotations of said edible and knife to divide said edible by a plurality of cuts.

7. A machine for cutting an edible having in combination, a support for said edible, a knife reciprocable toward and from said edible and adapted to successively make a plurality of related cuts in the edible about the surface thereof to eventually sever said edible into a plurality of parts, means for accomplishing step by step relative rotation of the surface to be cut of said edible and said knife about a central axis of said edible, whereby said knife will eventually traverse the full perimeter of said edible, and means for reciprocating said knife in a path terminating at said axis to accomplish a cut upon said edible at each interval between successive step by step relative rotations of said edible and knife.

8. A machine for cutting a single fruit into serrated form having in combination, a knife of trough shape, means for reciprocating said knife, a support for said fruit, and means for accomplishing relative step by step rotation of said knife and fruit about a central axis of said fruit, whereby said knife can eventually traverse the perimeter of said fruit to complete a plurality of related cuts in one plane thereon adapted to sever the fruit into a plurality of parts.

9. A machine for cutting a fruit having in combination, means for supporting said fruit, a reciprocable knife for severing said fruit by making a plurality of adjacent radial cuts in the fruit said knife being of much less width than the diameter of said fruit, means for accomplishing relative movement between said fruit and knife about a central axis of said fruit in order that the knife can operate upon different circumferential parts of said fruit, and means for adjusting said fruit supporting means in direction transversely of the plane of said knife.

10. A machine for cutting and scalloping a fruit or vegetable having in combination, means for supporting and intermittently rotating said fruit about a substantially central axis thereof, a knife trough-shaped in cross section and of much smaller width than the diameter of said fruit reciprocable in a plane substantially perpendicular to said axis and in a path terminating substantially at said axis, and means for reciprocating said knife in synchronism with the rotation of said first mentioned means.

11. A machine for cutting and scalloping a fruit or vegetable having in combination, means for supporting said fruit or vegetable, means for intermittently rotating said means to rotate said fruit or vegetable about a substantially central axis, a knife having a width much less than the diameter of said fruit or vegetable, said knife being trough-shaped in cross section, and means for reciprocating said knife towards said axis and in a path terminating substantially at said axis for making a plurality of adjacent cuts in said fruit in one plane to sever said fruit into two parts.

ALVIN P. BARNES.